(12) United States Patent
Lee et al.

(10) Patent No.: US 8,742,049 B2
(45) Date of Patent: *Jun. 3, 2014

(54) LONG CHAIN-BRANCHED ETHYLENE-ALPHA OLEFIN COPOLYMER

(71) Applicant: LG Chem, Ltd., Seoul (KR)

(72) Inventors: Choong-Hoon Lee, Daejeon Metropolitan City (KR); Byung-Kwon Lim, Daejeon Metropolitan City (KR); Eun-Jung Lee, Daejeon Metropolitan City (KR); Jong-Joo Ha, Daejeon Metropolitan City (KR); Seung-Whan Jung, Gyeonggi-Do (KR); Jung-A Lee, Daejeon Metropolitan City (KR); Ki-Su Ro, Daejeon Metropolitan City (KR); Don-Ho Kum, Daejeon Metropolitan City (KR); Dong-Kyu Park, Daejeon Metropolitan City (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,301

(22) Filed: Jul. 30, 2013

(65) Prior Publication Data

US 2013/0317186 A1 Nov. 28, 2013

Related U.S. Application Data

(63) Continuation of application No. 12/600,328, filed as application No. PCT/KR2008/002742 on May 16, 2008, now Pat. No. 8,513,369.

(30) Foreign Application Priority Data

May 16, 2007 (KR) .................. 10-2007-0047685

(51) Int. Cl.
*C08F 210/08* (2006.01)
*C08F 10/08* (2006.01)

(52) U.S. Cl.
USPC ........ 526/348.6; 526/170; 526/160; 526/134; 526/348

(58) Field of Classification Search
USPC ...................... 526/348.6, 172, 161
IPC .............. C08F 10/08,210/08, 2500/09
See application file for complete search history.

(56) References Cited

U.S. PATENT DOCUMENTS

| | | | |
|---|---|---|---|
| 3,179,719 A * | 4/1965 | Cines Martin R | 525/240 |
| 3,666,736 A * | 5/1972 | Hogan | 526/348.6 |
| 4,598,128 A | 7/1986 | Randall et al. | |
| 5,272,236 A | 12/1993 | Lai et al. | |
| 5,304,589 A * | 4/1994 | Davidson et al. | 524/178 |
| 5,326,602 A * | 7/1994 | Rifi | 428/35.7 |
| 5,444,145 A | 8/1995 | Brant et al. | |
| 5,700,895 A | 12/1997 | Kanda et al. | |
| 6,258,912 B1 | 7/2001 | Howard et al. | |
| 6,300,437 B1 | 10/2001 | Howard et al. | |
| 6,300,451 B1 * | 10/2001 | Mehta et al. | 526/339 |
| 6,462,161 B1 | 10/2002 | Cady et al. | |
| 6,518,385 B1 | 2/2003 | Chai | |
| 6,548,686 B2 | 4/2003 | Nabika et al. | |
| 6,800,700 B2 | 10/2004 | Sun | |
| 7,671,151 B2 * | 3/2010 | Nagy et al. | 526/172 |
| 7,932,207 B2 * | 4/2011 | Lee et al. | 502/308 |
| 7,972,987 B2 * | 7/2011 | Lee et al. | 502/155 |
| 8,039,554 B2 | 10/2011 | Iseki et al. | |
| 8,329,848 B2 * | 12/2012 | Kajihara et al. | 526/348.6 |
| 8,513,369 B2 * | 8/2013 | Lee et al. | 526/348.6 |
| 2004/0214953 A1 | 10/2004 | Yamada et al. | |
| 2004/0266963 A1 | 12/2004 | Chai et al. | |

FOREIGN PATENT DOCUMENTS

| | | |
|---|---|---|
| CN | 1121730 A | 5/1996 |
| JP | 8048711 A | 2/1996 |
| JP | 08-311260 | 11/1996 |
| JP | 9255713 A | 9/1997 |
| JP | 11-199641 A | 7/1999 |
| JP | 2005-089769 A | 4/2005 |
| JP | 2006321991 A | 11/2006 |
| JP | 2007-091993 A | 4/2007 |
| JP | 2010526203 A | 7/2010 |
| WO | 2008140205 A1 | 11/2008 |

OTHER PUBLICATIONS

International Search Report, PCT/KR2008/002742, dated Oct. 28, 2008.
Gibson et al., Chem. Rev., 103; 283-315 (2003).
Chen et al., Organometallics, 16; 5958-5963 (1997).
Zhang et al., Organometallics, 23; 540-546 (2004).
Turner et al., The Royal Society of Chemistry, 1034-1035 (2003).
Christie et al., Organometallics, 18; 348-359 (1999).
Gielens et al, Organmetallics, 17; 1652-1654 (1998).
Rau et al., Journal of Organometallics Chemistry, 608; 71-75 (2000).
Cho et al., Organometallics, 25; 2133-2134 (2006).
Wood-Adams, et al., Thermorheological Behavoior of Polyethylene: Effects of Microstructure and Long Chain Branching, Macromolecules, Jul. 25, 2001, vol. 34, 6281-6290.

* cited by examiner

*Primary Examiner* — Rip A. Lee
(74) *Attorney, Agent, or Firm* — Lerner, David, Littenberg, Krumholz & Mentlik, LLP

(57) ABSTRACT

The present invention relates to an ethylene-alpha olefin copolymer comprising long chain branches (LCB), while having a narrow molecular weight distribution. The ethylene-alpha olefin copolymer can be prepared by a continuous solution polymerization process using an activated catalyst composition containing a Group 4 transition metal compound having a monocyclopentadienyl ligand, to which a quinoline amino group is introduced.

8 Claims, No Drawings

LONG CHAIN-BRANCHED ETHYLENE-ALPHA OLEFIN COPOLYMER

CROSS-REFERENCE TO RELATED APPLICATIONS

The present application is a continuation of U.S. patent application Ser. No. 12/600,328, filed on Jan. 14, 2010, now U.S. Pat. No. 8,513,369, which application is a national phase entry under 35 U.S.C. §371 of International Application No. PCT/KR2008/002742 filed May 16, 2008, which claims priority from Korean Application No. 10-2007-0047685 filed May 16, 2007, all of which are hereby incorporated herein by reference.

TECHNICAL FIELD

The present invention relates to an ethylene-alpha olefin copolymer. In particular, the present invention relates to an ethylene-alpha olefin copolymer comprising long chain branches (LCB) along the copolymer main chain, while having a narrower molecular weight distribution, as compared to a conventional low density polyethylene (LDPE).

BACKGROUND ART

The Dow Chemical Company announced [Me$_2$Si(Me$_4$C$_5$)NtBu]TiCl$_2$ (Constrained-Geometry Catalyst, which will be simply referred to as CGC) in the early 1990's (U.S. Pat. No. 5,064,802), wherein in the copolymerization reaction of ethylene and alpha-olefin, excellent characteristics that the CGC has, as compared with per se known metallocene catalysts can be usually classified into the two categories: (1) it produces a high molecular weight polymer with high activity even at a high polymerization temperature, and (2) it yield very excellent copolymerization of an alpha-olefin having high steric hindrance, such as 1-hexene and 1-octene. In addition, upon polymerization reaction, there have been gradually several characteristics of CGC, and thus extensive studies to synthesize a derivative of CGC for use as a polymerization catalyst have been made in the academic and industrial fields.

As one approach, there have been trials for synthesis of metal compounds to which various bridges and nitrogen substituents instead of silicon bridges are introduced, and polymerization using the same. Some representative examples of recently known metal compounds include the followings (*Chem. Rev.* 2003, 103, 283):

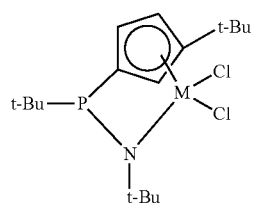
(1)

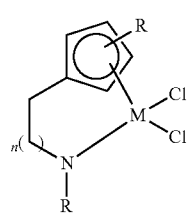
(2)

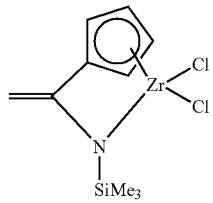
(3)

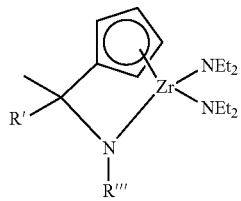
(4)

To the above-listed compounds, a phosphorous bridge (1), an ethylene or propylene bridge (2), a methylidene bridge (3), and a methylene bridge (4) are each introduced, instead of the silicon bridges in the CGC structure. However, when they are used for ethylene polymerization, or copolymerization with an alpha-olefin, they had no excellent results regarding the activity or the copolymerization performances, as compared with CGC.

As another approach, there have trials for synthesis of many compounds comprising an oxido ligand instead of the amido ligand of the CGC, and sometimes polymerization using the same. Examples thereof are summarized as follows:

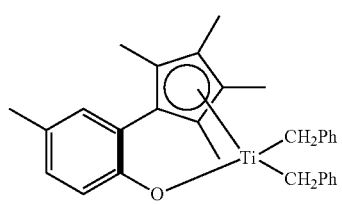
(5)

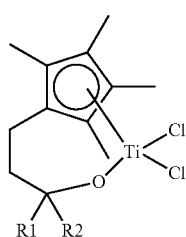
(6)

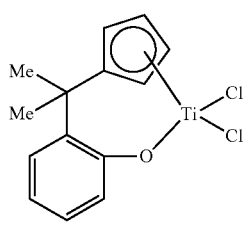
(7)

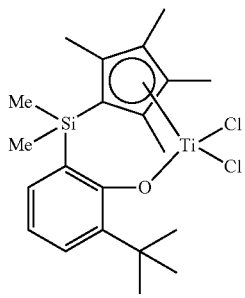

(8)

The compound (5) is characterized in that a Cp derivative and an oxido ligand are bridged via an ortho-phenylene group, as disclosed by T. J. Marks, et al. (*Organometallics* 1997, 16, 5958). Also, a compound having the same bridge and polymerization using the same are disclosed by Mu, et al. (*Organometallics* 2004, 23, 540). Further, an indenyl ligand and an oxido ligand are bridged via the same ortho-phenylene group, as disclosed by Rothwell, et al. (*Chem. Commun.* 2003, 1034). The (6) is characterized in that a cyclopentadienyl ligand and an oxido ligand are bridged through three carbons, as disclosed by Whitby, et al. (*Organometallics* 1999, 18, 348), and these catalysts are reported to exhibit activity on syndiotactic polystyrene polymerization. Further, similar compounds are also reported by Hessen, et al. (*Organometallics* 1998, 17, 1652). The compounds shown in (7) is characterized in that it exhibits activity on ethylene and ethylene/1-hexene copolymerization at a high temperature and a high pressure (210° C., 150 MPa), as disclosed by Rau, et al. (*J. Organomet. Chem.* 2000, 608, 71). Further, synthesis of a catalyst such as compound (8) which has similar structure to compound (7) and polymerization at a high temperature and a high pressure using the same were filed in the patent application by Sumitomo Corp. (U.S. Pat. No. 6,548,686).

However, in spite of the above trials, only few catalysts are substantially in use for commercial plants. Most ethylene-alpha olefin copolymer polymerized by using a transition metal compound has a narrower molecular weight distribution, as compared to a known LDPE obtained by high pressure reaction, but comprises no long chain branches or small content of long chain branches. Recently, extensive studies in the academic and industrial fields have been made to obtain polyolefin copolymer having long chain branches and several characters, and it still requires new catalysts and processes to achieve it.

DISCLOSURE OF INVENTION

Technical Problem

The present inventors found that an ethylene-alpha olefin copolymer prepared by using a catalyst composition containing specific quinoline transition metal compounds has a narrower molecular weight distribution and a higher content of long chain branches along the copolymer main chain, as compared to known ethylene alpha-olefin copolymers.

Accordingly, it is an object of the present invention to provide an ethylene alpha-olefin copolymer having a narrow molecular weight distribution and a high content of long chain branches along the copolymer main chain.

Technical Solution

In order to achieve the above object, the present invention provides an ethylene alpha-olefin copolymer having a molecular weight distribution (Mw/Mn) of 1.5 or above and less than 3.5 ($1.5 \leq Mw/Mn < 3.5$) and 3 to 5 long chain branches per 1000 carbons along the copolymer main chain.

Advantageous Effects

The ethylene-alpha olefin copolymer according to the present invention has a narrower molecular weight distribution, as compared to a known low density polyethylene obtained by high pressure reaction, to exhibit excellent mechanical and physical properties. Also, the ethylene-alpha olefin copolymer has a higher content of long chain branches, as compared to a known ethylene alpha-olefin copolymer obtained by a transition metal compound, to exhibit excellent processability.

BEST MODE FOR CARRYING OUT THE INVENTION

Hereinafter, the present invention will be described in more detail.

The ethylene-alpha olefin copolymer according to the present invention is characterized by having a narrow molecular weight distribution (Mw/Mn) of 1.5 or above and less than 3.5 ($1.5 \leq Mw/Mn < 3.5$) and 3 to 5 long chain branches per 1000 carbons along the copolymer main chain.

It is preferable that the ethylene-alpha olefin copolymer has a weight-average molecular weight of 50,000 or above and less than 1,000,000.

As used herein, the term "molecular weight distribution" is defined as a ratio of the weight-average molecular weight to the number-average molecular weight.

As used herein, the term "long chain" means a polymer chain having 6 or more carbon atoms.

The ethylene-alpha olefin copolymer may be prepared by using a catalyst composition containing a transition metal compound of the following Formula 1 as a catalyst.

[Formula 1]

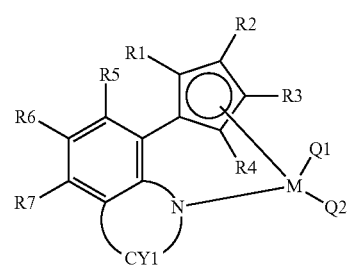

wherein R1 to R7 are the same as or different from each other, and each independently selected from the group consisting of hydrogen, a halogen radical, an alkyl radical having 1 to 20 carbon atoms, an aryl radical having 6 to 20 carbon atoms, an alkenyl radical having 2 to 20 carbon atoms, an alkylaryl or arylalkyl radical having 7 to 20 carbon atoms, a Group 14 metalloid radical substituted with hydrocarbyl, an alkoxy radical having 1 to 20 carbon atoms, an aryloxy radical having 6 to 20 carbon atoms, a silyl radical and an amino radical, in which two or more thereof may be connected to each other by an alkylidene radical containing an alkyl radical having 1 to 20 carbon atoms or aryl radical having 6 to 20 carbon atoms to form an aliphatic or aromatic ring, CY1 is a substituted or unsubstituted aliphatic or aromatic ring, in which CY1 may be substituted with at least one selected from the group consisting of hydrogen, a halogen radical, an alkyl radical having 1 to 20 carbon atoms and aryl radical having 6 to 20 carbon atoms, and in the case where CY1 is substituted with the plural substituents, two or more substituents may be connected to each other to form an aliphatic or aromatic ring;

M is a Group 4 transition metal;

N is a nitrogen atom; and

Q1 and Q2 are the same as or different from each other, and each independently selected from the group consisting of a halogen radical, an alkyl amido radical having 1 to 20 carbon atoms, an aryl amido radical having 6 to 20 carbon atoms, an alkyl radical having 1 to 20 carbon atoms, an alkenyl radical having 2 to 20 carbon atoms, an aryl radical having 6 to 20 carbon atoms, an alkylaryl or arylalkyl radical having 7 to 20 carbon atoms and alkylidene radical having 1 to 20 carbon atoms.

In particular, the transition metal compound represented by Formula 1 is a compound represented by the following Formula 2.

[Formula 2]

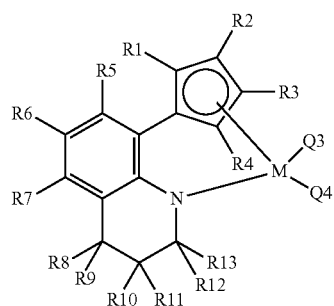

wherein R1 to R13 are the same as defined in R1 to R7 of Formula 1,

M, N, Q3 and Q4 are the same as defined in M, N, Q1 and Q2 of Formula 1.

More specifically, the compound represented by Formula 2 is a compound of the following Formula 3 or 4.

[Formula 3]

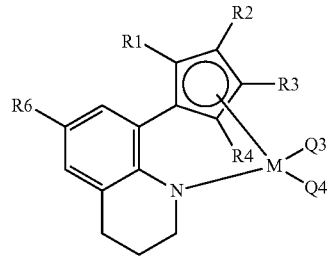

[Formula 4]

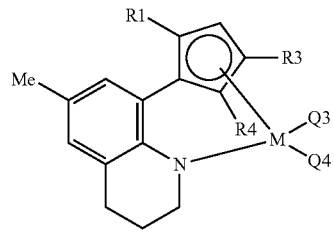

wherein R1 to R4, R6, M, N, Q3 and Q4 are the same as defined in Formula 2.

The transition metal compound of Formula 1 includes transition metal compounds having the following structures as a preferred compound to control the electronic or steric environment around the metal:

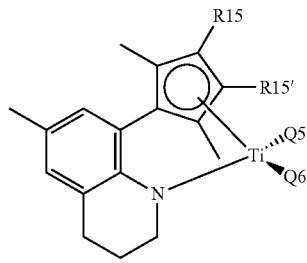

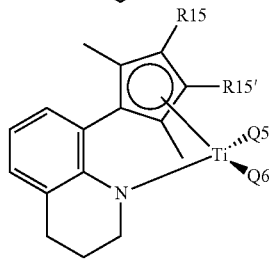

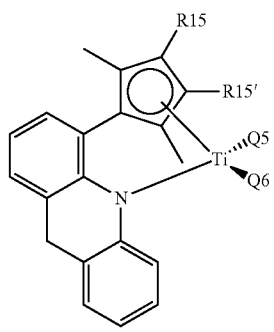

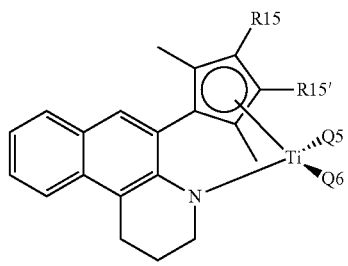

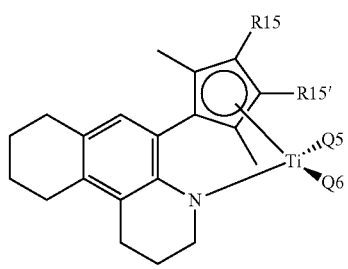

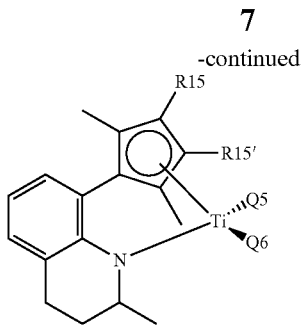
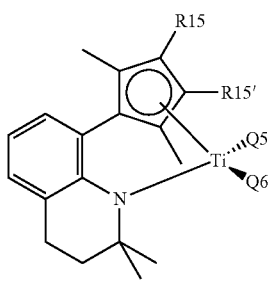
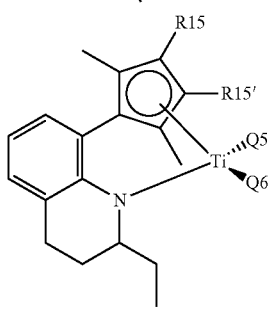
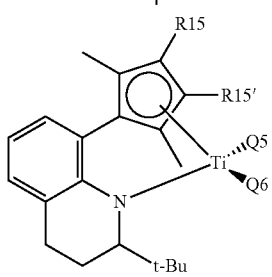
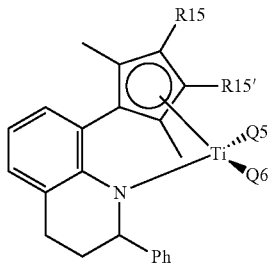
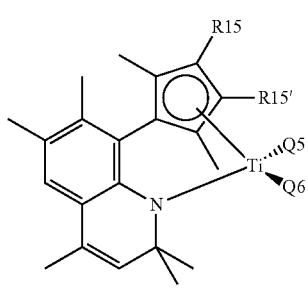

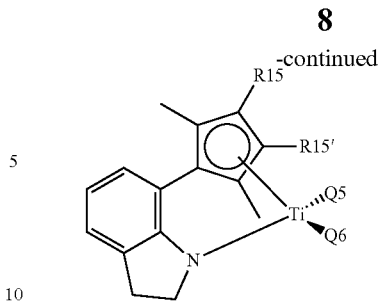

wherein R15 and R15' are each independently selected from hydrogen and a methyl radical, and Q5 and Q6 are each independently selected from methyl, dimethylamido and chloride radicals.

The catalyst composition containing the transition metal compound of Formula 1 may further include one or more of cocatalyst compounds represented by the following Formulae 5 to 7.

—[Al(R16)-O]$a$-    [Formula 5]

wherein R16 is each independently selected from the group consisting of a halogen radical, a hydrocarbyl radical having 1 to 20 carbon atoms, and a hydrocarbyl radical having 1 to 20 carbon atoms which is substituted with halogen, a is an integer of 2 or more;

D(R17)$_3$    [Formula 6]

wherein D is aluminum or boron;

R17 is each independently selected from the group consisting of a halogen radical, a hydrocarbyl radical having 1 to 20 carbon atoms, and a hydrocarbyl radical having 1 to 20 carbon atoms which is substituted with halogen;

[L-H]$^+$[ZA$_4$]$^-$ or [L]$^+$[ZA$_4$]$^-$    [Formula 7]

wherein L is neutral or cationic Lewis acid,

H is a hydrogen atom,

Z is an element of Group 13 selected from B, Al, Ga, In and Tl, and

A is each independently an aryl radical having 6 to 20 carbon atoms, or an alkyl radical having 1 to 20 carbon atoms, wherein at least one hydrogen atom in said aryl radical and alkyl radical is substituted with halogen, a hydrocarbyl having 1 to 20 carbon atoms, alkoxy, or phenoxy radical.

Among the cocatalyst compounds, the compounds represented by Formulae 5 and 6 may be used as an alkylating agent, and the compound represented by Formula 7 may be used as an activating agent.

The catalyst composition exists in the state activated by the reaction of the transition metal compound of Formula 1 with the cocatalysts, which may be referred to as an activated catalyst composition. However, since it is well known in the art that the catalyst composition exists in the activated state, it would not particularly use the term "activated catalyst composition" in the present specification.

The above described substituents are defined as follows.

The "hydrocarbyl" means a monovalent substituent formed by the removal of a hydrogen atom from hydrocarbon, and includes ethyl, phenyl or the like.

The "metalloid" is an element which behaves chemically both as a metal and as a non-metal, and includes arsenic, boron, silicon, tellurium or the like.

The ethylene-alpha olefin copolymer according to the present invention may be prepared by polymerization of ethylene and alpha olefin using a catalyst composition comprising the compound of Formula 1 and at least one cocatalyst of compounds of Formulae 5 to 7.

The catalyst composition may be prepared by the methods for preparing a catalyst composition as follows.

First, the present invention provides a method for preparing the catalyst composition, comprising the steps of: a) contacting the transition metal compound represented by Formula 1 and the compound represented by Formula 5 or 6 to obtain a mixture; and b) adding the compound represented by Formula 7 to the mixture.

Second, the present invention provides a method for preparing the catalyst composition, comprising a step of contacting the transition metal compound represented by Formula 1 and the compound represented by Formula 5.

Third, the present invention provides a method for preparing the catalyst composition, comprising a step of contacting the transition metal compound represented by Formula 1 and the compound represented by Formula 6.

In the first method of the methods for preparing the catalyst composition, the molar ratio of the transition metal compound of the formula 1 to the compound represented by the formula 5 or 6 is preferably 1:2 to 1:5,000, more preferably 1:10 to 1:1,000, and most preferably 1:20 to 1:500.

In the first method for preparing the catalyst composition, if the molar ratio of the transition metal compound of the formula 1 to the compound represented by the formula 5 or 6 is more than 1:2, the amount of the formula 5 or 6 as the alkylating agent is too low, which causes a problem of not completely performing alkylation of the metal compound. If the molar ratio is less than 1:5,000, the metal compound is alkylated but the side reaction between the remaining excessive amount of the alkylating agent and the activating agent of the formula 7 causes a problem of not completely performing activation of the alkylated metal compound.

Moreover, the molar ration of the transition metal compound of the formula 1 to the compound represented by the formula 7 is preferably 1:1 to 1:25, more preferably 1:1 to 1:10, and most preferably 1:2 to 1:5. If the molar ratio of the transition metal compound of the formula 1 to the compound represented by the formula 7 is more than 1:1, the amount of the activating agent is relatively low, which causes a problem of not completely performing activation of the transition metal compound, and thus of lowering the activity of the resulting catalyst composition. If the molar ratio is less than 1.25, there is a problem that the transition metal compound is completely activated, but the remaining excessive amount of the activating agent increases the cost of the catalyst composition or the purity of the resulting polymer is lowered.

In the second method for preparing the catalyst composition, if the molar ratio of the transition metal compound of the formula 1 to the compound represented by the formula 5 is preferably 1:10 to 1:10,000, more preferably 1:100 to 1:5,000, and most preferably 1:500 to 1:2000.

If the molar ratio is more than 1:10, the amount of the activating agent is relatively low, which causes a problem of not completely performing activation of the metal compound, and thus of lowering the activity of the resulting catalyst composition. If the molar ratio is less than 1:10,000, there is a problem that the transition metal compound is completely activated, but the remaining excessive amount of the activating agent increases the cost of the catalyst composition or the purity of the resulting polymer is lowered.

Moreover, in the third method for preparing the catalyst composition, if the molar ratio of the transition metal compound of the formula 1 to the compound represented by the formula 7 is preferably 1:1 to 1:25, more preferably 1:1 to 1:10, and most preferably 1:2 to 1:5.

If the molar ratio of the transition metal compound of the formula 1 to the compound represented by the formula 7 is more than 1:1, the amount of the activating agent is relatively low, which causes a problem of not completely performing activation of the metal compound, and thus of lowering the activity of the resulting catalyst composition. If the molar ratio is less than 1:25, there is a problem that the transition metal compound is completely activated, but the remaining excessive amount of the activating agent increases the cost of the catalyst composition or the purity of the resulting polymer is lowered.

In the preparation of the catalyst composition, as the reaction solvent, a hydrocarbon solvent such as pentane, hexane and heptane, or an aromatic solvent such as benzene and toluene can be used, but not limited thereto. All of the solvents available in the art can be used.

The transition metal compound of the formula 1 and the cocatalyst can be used as type supported on silica or alumina.

The compound represented by the formula 5 is not particularly limited as long as it is alkylaluminoxane, and preferable examples thereof include methylaluminoxane, ethylaluminoxane, isobutylaluminoxane and butylaluminoxane, among said compounds methylaluminoxane is a particularly preferred compound.

The alkyl metal compound represented by the formula 6 is not particularly limited, and preferable examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron, among said compounds a particularly preferred compound is selected from trimethylaluminum, triethylaluminum, and triisobutylaluminum.

Examples of the compound represented by the formula 7 include triethylammoniumtetra(phenyl)boron, tributylammoniumtetra(phenyl)boron, trimethylammoniumtetra(phenyl)boron, tripropylammoniumtetra(phenyl)boron, trimethylammoniumtetra(p-tolyl)boron, trimethylammoniumtetra(o,p-dimethylphenyl)boron, tibutylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, N,N-diethylaniliniumtetra(phenyl)boron, N,N-diethylaniliniumtetra(pentafluorophenyl)boron, diethylammoniumtetra(pentafluorophenyl)boron, triphenylphosphoniumtetra(phenyl)boron, trimethylphosphoniumtetra(phenyl)boron, triethylammoniumtetra(phenyl)aluminum, tributylammoniumtetra(phenyl)aluminum, trimethylammoniumtetra(phenyl)aluminum, tripropylammoniumtetra(phenyl)aluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetra(pentafluorophenyl)aluminum, N,N-diethylaniliniumtetra(phenyl)aluminum, N,N-dimethylaniliniumtetra(phenyl)aluminum, N,N-diethylaniliniumtetra(pentafluorophenyl)aluminum, diethylammoniumtetra(pentafluorophenyl)aluminum, triphenylphosphoniumtetra(phenyl)aluminum, trimethylphosphoniumtetra(phenyl)aluminum, triethylammoniumtetra(phenyl)aluminum, tributylammoniumtetra(phenyl)aluminum, trimethylammoniumtetra(phenyl)boron, tripropylammoniumtetra(phenyl)boron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra (pentafluorophenyl)boron, N,N-diethylaniliniumtetra (phenyl)boron, N,N-diethylaniliniumtetra(phenyl)boron, N,N-diethylaniliniumtetra(pentafluorophenyl)boron, diethylammoniumtetra(pentafluorophenyl)boron, triphenylphosphoniumtetra(phenyl)boron, triphenylcarboniumtetra(p-trifluoromethylphenyl)boron, triphenylcarboniumtetra (pentafluorophenyl)boron, tritytetra(pentafluorophenyl) boron, etc.

In the polymerization of a ethylene alpha-olefin copolymer according to the present invention, the catalyst composition can be dissolved or diluted with an aliphatic hydrocarbon solvent having 5 to 12 carbon atoms suitable for an polymerization process, such as pentane, hexane, heptane, nonane, decane, and isomers thereof; an aromatic hydrocarbon solvent such as toluene and benzene; a hydrocarbon solvent substituted with chlorine such as dichloromethane and chlorobenzene, prior to injection. The solvent used herein is preferably used after removing a small amount of water, air, etc. which functions as a catalyst toxin, by treatment with a small amount of alkylaluminum, and a cocatalyst can be additionally used therefor.

Alpha-olefin comonomers copolymerized with ethylene using the above mentioned catalyst composition include diene olefin based monomers and triene olefin based monomers having two or more double bonds. The alpha-olefin comonomer is preferably alpha-olefin having 3 to 20 carbon atoms. Examples of the alpha-olefin comonomer include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc. and mixtures of the above monomer can also be used. The alpha-olefin comonomer is preperably selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene. More preferably selected from the group consisting of ethylene, propylene, 1-butene, 1-hexene, 4-methyl-1-pentene, and 1-octene. 1-octene is most preferable. At this time, a preferred polymerization solvent is n-hexane.

In the polymerization process of the ethylene-alpha olefin copolymer according to the present invention, a continuous solution polymerization process using the catalyst composition is preferable. The catalyst composition can be employed in a slurry or gas phase process, in combination with an inorganic carrier such as silica.

A preferred reactor used in the polymerization process of the ethylene-alpha olefin copolymer is a continuous stirred tank reactor (CSTR) or plug flow reactor (PFR). In the polymerization process of the ethylene-alpha olefin copolymer, two or more reactors are preferably arranged in series or in parallel. In addition, it is preferable that the polymerization process of the ethylene-alpha olefin copolymer further includes a separator to continuously separate the solvent and unreacted monomers from the reaction mixture.

The continuous solution polymerization process may consist of a catalyst process, a polymerization process, a solvent separation process, and a recovery process, as follows.

a) Catalyst Process

In the method for preparing the ethylene-alpha olefin copolymer according to the present invention, the catalyst composition can be dissolved or diluted with an aliphatic or aromatic solvent having 5 to 12 carbon atoms which is substituted or unsubstituted with halogen suitable for an olefin polymerization process, and examples thereof may include an aliphatic hydrocarbon solvent such as pentane, hexane, heptane, nonane, decane, and isomers thereof, an aromatic hydrocarbon solvent such as toluene, xylene and benzene, a hydrocarbon solvent substituted with chlorine such as dichloromethane and chlorobenzene, prior to injection. The solvent used herein is preferably used after removing a small amount of water, air or the like which functions as a catalyst toxin, by treatment with a small amount of alkylaluminum, and a cocatalyst can be additionally used therefor.

b) Polymerization Process

In the reactor, the polymerization process proceeds by introducing the catalyst composition containing the transition metal compound of Formula 1 and a cocatalyst, ethylene monomers, and alpha olefin comonomers. In a solution or slurry phase process, a solvent is injected to the reactor. In the solution polymerization, a mixed solution of the solvent, catalyst composition, monomer and comonomer exists in the reactor.

The molar ratio of ethylene to alpha olefin comonomer is 100:1 to 1:100, preferably 10:1 to 1:10, and most preferably 2:1 to 1:5. In the case where the molar ratio is more than 100:1, a density of the produced copolymer is increased. Thus, it is difficult to prepare a low density copolymer. In the case where the molar ratio is less than 1:100, the amount of unreacted comonomer is increased to reduce the conversion rate, thereby problematically increasing process recycling.

A suitable molar ratio of monomer to solvent is a ratio suitable for dissolving the materials before reaction and the polymers produced after reaction. Specifically, the molar ratio of monomer to solvent is 10:1 to 1:10000, preferably 5:1 to 1:100, and most preferably 1:1 to 1:20. In the case where the molar ratio is more than 10:1, the amount of solvent is very low to increase the viscosity of fluid, thereby causing a problem in transportation of the produced copolymer. In the case where the molar ratio is less than 1:10000, the amount of solvent is too high, thereby increasing equipment and energy costs due to purification and recycling of solvent.

The solvent is preferably injected at −40 to 150° C. using a heater or freezer, and thus polymerization reaction is initiated with the monomers and the catalyst composition. In the case where the temperature of the solvent is less than −40° C., the temperature is too low to control the reaction temperature, even though there is a difference depending on the reaction amount. In the case where the temperature of the solvent is more than 150° C., the temperature of the solvent is too high to remove heat of reaction.

The pressure is increased to 50 bar or more using a high-capacity pump, and then the materials (solvent, monomer, catalyst composition, etc.) are supplied, thereby passing the mixed materials without arrangement of reactor, and additional pumping between a pressure drop device and a separator.

The internal temperature of the reactor, that is, polymerization temperature suitable for the present invention is −15 to 300° C., preferably 50 to 200° C., and most preferably 100 to 200° C. In the case where the internal temperature is less than −15° C., the reaction rate is very low to decrease productivity. In the case where the internal temperature is more than 300° C., discoloration may occur, such as impurities due to side reactions and carbonization of copolymer.

The internal pressure of the reactor, suitable for the present invention, is 1 to 300 bar, preferably 30 to 200 bar, and most preferably 50 to 100 bar. In the case where the internal pressure is less than 1 bar, the reaction rate is decreased to reduce productivity and vaporization of the solvent may be caused. In the case where the internal pressure is more than 300 bar, equipment cost due to high pressure is increased.

The copolymers produced in the reactor are maintained at a concentration of 20 wt % or less in the solvent, and after a short retention time, the copolymers are preferably transported to a first solvent separation process for removal of solvent. The retention time of the copolymers according to the present invention is 1 min to 10 hrs, preferably 3 min to 1 hr, and most preferably 5 min to 30 min. In the case where the retention time is less than 1 min, production costs are increased due to the reduction in productivity and loss of catalyst. In the case where the retention time is more than 10 hrs, the reaction proceeds over a suitable activation period of catalyst to increase the reactor size, leading to an increase in equipment cost.

c) Solvent Separation Process

To remove the solvent which is present with copolymers drained out of the reactor, a solvent separation process is performed by changing the temperature and pressure of the solution. For example, the temperature of the polymer solution transported from the reactor is increased to about 200 to 230° C. by a heater, and then its pressure is reduced by a pressure drop device to evaporate unreacted materials and solvent in a first separator.

At this time, the internal pressure of the separator is 1 to 30 bar, preferably 1 to 10 bar, and most preferably 3 to 8 bar. The internal temperature of the separator is 150 to 250° C., preferably 170 to 230° C., and most preferably 180 to 230° C.

In the case where the internal pressure of the separator is less than 1 bar, the content of polymer is increased to cause a problem in transportation. In the case where the internal pressure of the separator is more than 30 bar, the separation of solvent used in the polymerization is difficult. Further, in the case where the internal temperature of the separator is less than 150° C., the viscosity of the copolymer and its mixture is increased to cause a problem in transportation. In the case where the internal temperature of the separator is more than 250° C., discoloration may occur due to carbonization of copolymer by high temperature.

The solvent evaporated in the separator may be recycled from an overhead system to a condensed reactor. After the first solvent separation process, a polymer solution concentrated to 65% may be obtained. The polymer solution is transported to a second separator by a transportation pump through a heater, and the residual solvent is separated in the second separator. While passing through the heater, a thermal stabilizer is injected to prevent polymer deformation due to high temperature. In addition to the thermal stabilizer, a reaction inhibitor is injected into the heater to prevent polymerization due to activity of activated material present in the polymer solution. The residual solvent in the polymer solution injected into the second separator is completely removed by a vacuum pump, and particulate polymers can be obtained through cooling water and a cutter. The solvent evaporated in the second separation process and other unreacted monomers are purified and recycled in a recovery process.

d) Recovery Process

The organic solvent injected with materials during polymerization process may be recycled with the unreacted material in the first solvent separation process, and then also used in the polymerization process. However, the solvent recovered in the second solvent separation process is preferably reused after purification in a recovery process, since it is contaminated with the reaction inhibitor which is mixed for termination of catalyst activity, and contains a large amount of water which functions as a catalyst toxin due to steam supply of vacuum pump.

The ethylene-alpha olefin copolymer prepared by the above described method has a narrow molecular weight distribution of 1.5 or above and less than 3.5, and 3 to 5 long chain branches per 1000 carbons along the copolymer main chain. The copolymer exhibits more excellent processability, as compared to a copolymer containing no long chain branch, or a copolymer having less than 3 long chain branches per 1000 carbons along the copolymer main chain.

MODE FOR THE INVENTION

Hereinafter, the present invention will be described in more detail with reference to the following Examples. However, these Examples are for the illustrative purpose only, and the invention is not intended to be limited by these Examples.

Synthesis of Ligand and Metal Compound

Preparative Example 1

5-bromo-7-methyl-1,2,3,4-tetrahydroquinoline

A solution of 6-methyl-1,2,3,4-tetrahydroquinoline (1.16 g, 7.90 mmol) in carbon tetrachloride (4 mL) was cooled to −20° C. N-bromosuccinimide (1.41 g, 7.90 mml) solid was slowly added thereto, and the reaction temperature was raised to room temperature, followed by further reaction for 5 hrs. The produced compound was separated by column chromatography using a solvent of MC (methylenechloride) and hexane (1:1) to obtain light yellow oil (0.71 g, 40%).

$^1$H NMR($C_6D_6$): δ 1.42-1.52 (m, 2H, $CH_2$), 2.00 (s, 3H, $CH_3$), 2.39 (t, J=6.4 Hz, 2H, CH), 2.75 (dt, J=2.8, 8.4 Hz, 2H, N—CH), 4.04 (br s, 1H, NH), 6.51 (s, 1H, $C_6H_2$), 7.09 (s, 1H, $C_6H_2$) ppm.
$^{13}C\{^1H\}$ NMR ($C_6D_6$): δ 20.06, 22.04, 27.60, 41.91, 108.84, 122.59, 126.16, 129.48, 130.67, 139.79 ppm. Anal. Calc. ($C_{10}H_{12}BrN$): C, 53.12; H, 5.35; N, 6.19%. Found: C, 53.30; H, 5.13; N, 6.51%.

Preparative Example 2

5-(3,4-dimethyl-2-cyclopentene-1-on)-7-methyl-1,2,3,4-tetrahydroquinoline

Degassed DME (21 mL) and water (7 mL) were added to 2-(dihydroxyboryl)-3,4-dimethyl-2-cyclopentene-1-on (1.27 g, 8.26 mmol), $Na_2CO_3$ (1.25 g, 11.8 mmol), $Pd(PPh_3)_4$ (0.182 g, 0.157 mmol), and 5-bromo-7-methyl-1,2,3,4-tetrahydroquinoline (7.87 mmol), and the prepared solution was heated at 95° C. overnight. The reaction solution was cooled to room temperature, and extracted with an ethylacetate solvent (50 mL) twice. The obtained compound was separated by column chromatography using a solvent of hexane and ethyl acetate (2:1) to obtain a light yellow solid (90%).

$^1$H NMR($C_6D_6$): δ 0.77 (d, J=7.2 Hz, 3H, $CH_3$), 1.59-1.70 (m, 2H, $CH_2CH_2CH_2$), 1.65 (s, 3H, $CH_3$), 1.84 (dd, J=2.4, 18.4 Hz, 1H, $OCCH_2$), 2.21 (s, 3H, $CH_3$), 2.20-2.30 (m, 1H, CH), 2.44 (dd, J=6.4, 18.4 Hz, 1H, $OCCH_2$), 2.60 (br t, J=6 Hz, 2H, $CH_2$), 2.97 (br t, J=5.6 Hz, 2H, N—$CH_2$), 4.06 (s, 1H, NH), 6.66 (s, 1H, CH, $C_6H_2$), 6.74 (s, 1H, $C_6H_2$) ppm.

$^{13}C\{H\}$ NMR ($C_6D_6$): δ 15.83, 19.06, 20.58, 22.51, 27.92, 37.52, 42.48, 43.55 ppm. Anal. Calc. ($C_{17}H_{21}NO$): C, 79.96; H, 8.29; N, 5.49%. Found: C, 80.17; H, 8.44; N, 5.75%.

Preparative Example 3

5-(2,3,5-trimethyl-1,3-cyclopentadienyl)-7-methyl-1, 2,3,4-tetrahydroquinoline

Anhydrous La(OTf)$_3$ (21.4 mmol) and TFH (24 mL) were cooled to −78° C., and then MeLi (13.4 mL, 21.4 mmol) was added thereto, followed by reaction for 1 hr. 5-(3,4-Dimethyl-2-cyclopentene-1-on)-7-methyl-1,2,3,4-tetrahydroquinoline (7.13 mmol) was added thereto, subjected to reaction at −78° C. for 2 hrs, and extracted using a solvent of water and acetate. The obtained organic layer was shaken with HCl (2 N, 20 mL) for 2 min, neutralized with a NaHCO$_3$ aqueous solution (20 mL), and then dried over MgSO$_4$. The obtained compound was separated by column chromatography using a solvent of hexane and ethyl acetate (10:1) to obtain a light yellow solid (40%).

$^1$H NMR($C_6D_6$): δ 1.66-1.71 (m, 2H, $CH_2CH_2CH_2$), 1.80 (s, 3H, $CH_3$), 1.89 (s, 3H, $CH_3$), 1.90 (s, 3H, $CH_3$), 2.24 (s, 3H, $CH_3$), 2.64 (br t, J=6.4 Hz, 2H, $CH_2$), 2.74 (d, J=2 Hz, 2H, $CH_2$), 2.86-2.92 (m, 2H, N—$CH_2$), 3.62 (br s, 1H, NH), 6.75 (s, 1H, $C_6H_2$), 6.77 (s, 1H, $C_6H_2$) ppm.

$^{13}C\{^1H\}$ NMR ($C_6D_6$): δ 11.85, 13.61, 14.39, 20.74, 22.86, 27.70, 42.20, 48.88, 120.81, 122.01, 124.78, 128.68, 129.36, 132.87, 136.36, 136.65, 140.75, 141.15 ppm.

Preparative Example 4

Bis(dimethylamido)titanium Compound 5-(2,3,5-Trimethyl-1,3-cyclopentadienyl)-7-methyl-1,2,3,4-tetrahydroquinoline ligand (0.696 mmol) and Ti(NMe$_2$)$_4$ compound (0.156 g, 0.696 mmol) were dissolved in toluene (2 mL), and then the reaction solution was subjected to reaction at 80° C. for 2 days. All solvents were removed to obtain a red solid compound (100%). The Bis(dimethylamido)titanium compound was characterized by $^1$H-NMR analysis.

$^1$H NMR($C_6D_6$): 1.69-1.74 (m, 2H, $CH_2CH_2CH_2$), 1.86 (s, 3H, CH), 1.88 (s, 3H, $CH_3$), 1.92 (s, 3H, $CH_3$), 2.31 (s, 3H, $CH_3$), 2.57 (t, J=5.6 Hz, 2H, $CH_2$), 2.95 (s, 6H, $NCH_3$), 3.27 (s, 6H, $NCH_3$), 4.02 (ddd, J=5.2, 7.2, 12.0 Hz, 1H, $NCH_2$), 4.24 (dt, J=5.2, 12.4 Hz, 1H, $NCH_2$), 5.78 (s, 1H, Cp-H), 6.77 (s, 1H, $C_6H_2$), 6.91 (s, 1H, $C_6H_2$) ppm.

Preparative Example 5

Dichloridetitanium Compound

Toluene (2 mL) was added to the obtained bis(dimethylamido)titanium compound in Preparative Example 4, and then Me$_2$SiCl$_2$ (0.269 g, 2.09 mmol) was added thereto at room temperature. The reaction solution was subjected to reaction for 4 hrs. The obtained compound was recrystallized from hexane at −30° C. to obtain a pure red solid (0.183 g, 66%).

$^1$H NMR($C_6D_6$): 1.36-1.44 (m, 2H, $CH_2CH_2CH_2$), 1.76 (s, 3H, $CH_3$), 1.85 (s, 3H, $CH_3$), 2.07 (s, 3H, $CH_3$), 2.18 (s, 3H, $CH_3$), 2.12 (t, J=4 Hz, 2H, $CH_2$), 4.50-4.70 (m, 2H, N—$CH_2$), 6.02 (s, 1H, Cp-H), 6.59 (s, 1H, $C_6H_2$), 6.78 (s, 1H, $C_6H_2$) ppm.

$^{13}C\{^1H\}$ NMR($C_6D_6$): 12.76, 14.87, 15.06, 21.14, 22.39, 26.32, 54.18, 117.49, 120.40, 126.98, 129.53, 130.96, 131.05, 133.19, 143.22, 143.60, 160.82 ppm. Anal. Calc. ($C_{18}H_{21}Cl_2NTi$): C, 58.41; H, 5.72; N, 3.78%. Found: C, 58.19; H, 5.93; N, 3.89%.

Copolymerization of Ethylene and 1-Butene

Examples 1-6

Copolymerization of Ethylene and 1-Butene by Continuous Solution Process

A hexane (4.33~6.09 kg/h) solvent, 1-butene, and ethylene monomer were supplied into a 1 L continuous stirred reactor at a pressure of 89 bar. Preparative Example 5 (0.2-0.66 mol/min, Al/Ti=25), which was treated with a triisobutylaluminium compound, and an octadecylmethylammonium tetrakis(pentafluorophenyl)borate (1.2-3.96 mol/min) cocatalyst were supplied from a catalyst storage tank to the reactor to perform copolymerization reaction. The pressure of polymer solution produced by the copolymerization reaction was reduced to 7 bar at the end of the reactor, and then supplied into a solvent separator preheated to 230° C. to remove the solvent by the solvent separation process. The residual solvent was completely removed from the copolymers, which were supplied into a second separator by a pump, by using a vacuum pump, and then passed through cooling water and cutter to give particulate polymers. The conditions and results of polymerization of ethylene and 1-butene copolymer according to the present invention are shown in the following Tables 1 and 2, respectively.

TABLE 1

| Example | Catalyst | Hexane feed (kg/hr) | Ethylene feed (kg/hr) | Molar ratio of butene/ ethylene | Reaction temperature (° C.) | Catalyst (mol/min) | B/Ti (molar) | $H_2$ (L/hr) |
|---|---|---|---|---|---|---|---|---|
| Example 1 | Preparative Example 5 | 6.09 | 0.87 | 0.287 | 144.5 | 0.66 | 6 | 0.2 |
| Example 2 | Preparative Example 5 | 6.09 | 0.87 | 0.287 | 145.4 | 0.66 | 6 | 0.4 |
| Example 3 | Preparative Example 5 | 6.09 | 0.87 | 0.287 | 145.6 | 0.66 | 6 | 0.5 |
| Example 4 | Preparative Example 5 | 4.33 | 0.92 | 0.489 | 162.6 | 0.20 | 6 | 0.2 |
| Example 5 | Preparative Example 5 | 4.33 | 0.92 | 0.489 | 156.4 | 0.20 | 6 | 0.4 |

TABLE 1-continued

| Example | Catalyst | Hexane feed (kg/hr) | Ethylene feed (kg/hr) | Molar ratio of butene/ ethylene | Reaction temperature (° C.) | Catalyst (mol/min) | B/Ti (molar) | $H_2$ (L/hr) |
|---|---|---|---|---|---|---|---|---|
| Example 6 | Preparative Example 5 | 4.33 | 0.92 | 0.489 | 156.0 | 0.20 | 6 | 0.6 |

TABLE 2

| Example | Yield (kg/hr) | Copolymer (wt %) | Activity (kgPE/ mmol Ti) | Ethylene Conversion (%) | Butene Conversion (%) | Density (g/cc) | PDI | $MI_2$(g/ 10 min) |
|---|---|---|---|---|---|---|---|---|
| Example 1 | 1.15 | 15.4 | 29.0 | 92.1 | 70 | 0.863 | 2.84 | 3.93 |
| Example 2 | 1.13 | 15.1 | 28.5 | 91.1 | 67 | 0.864 | 2.79 | 4.75 |
| Example 3 | 1.13 | 15.1 | 28.5 | 91.0 | 67 | 0.864 | 2.75 | 6.03 |
| Example 4 | 0.78 | 12.7 | 65.3 | 60.2 | 25 | 0.865 | 2.37 | 2.25 |
| Example 5 | 0.73 | 11.9 | 61.0 | 55.9 | 24 | 0.864 | 2.34 | 3.27 |
| Example 6 | 0.72 | 11.7 | 60.1 | 55.4 | 23 | 0.865 | 2.38 | 4.66 |

As shown in Table 2, it can be seen that the copolymer according to the present invention has a low density according to polymerization conditions. In addition, it can be seen that the copolymer has a melt index in a wide range of 2~7 g/10 min according to polymerization conditions.

Comparative Examples 1~2

In order to compare physical properties, an ethylene 1-butene copolymer (ENR7447) purchased from Dow was used as a Comparative Example 1, and an ethylene 1-butene copolymer (DF640) purchased from Mitsui was used as a Comparative Example 2.

<Evaluation of Physical Property>

The polymers treated with an antioxidant (1,000 ppm) were prepared to a sheet having a thickness of 3 mm and a diameter of 2 cm using a press mold at 180° C., and cooled at 10° C./min to measure their density with a Mettler scale.

Further, their melt index ($MI_2$) was measured according to ASTM D-1238 (condition E, 190° C., 2.16 Kg load).

In addition, a molecular weight (Mw) and molecular weight distribution (PDI) of polymers were analyzed using a high-temperature GPC (Gel Permeation Chromatography) purchased from Polymer Laboratory. The analysis was performed at 160° C. using trichlorobenzene (TCB) as a solvent. The content of butene was determined using H-NMR, and the content of long chain branch was analyzed using $C^{13}$-NMR.

The content of 1-butene, density, melt index, content of long chain branch, molecular weight, and molecular weight distribution of the copolymer according to the present invention and the products of Comparative Examples 1 and 2 which were purchased from competitor company are shown in Table 3.

TABLE 3

| Example | Density (g/cc) | $MI_2$(g/10 min) | Butene content (mol %) | LCB/ (1000C) | Mw | PDI |
|---|---|---|---|---|---|---|
| Example 1 | 0.863 | 3.93 | 18.4 | 5.0 | 84,788 | 2.84 |
| Example 2 | 0.864 | 4.75 | 18.2 | 3.0 | 82,670 | 2.79 |
| Example 3 | 0.864 | 6.03 | 18.4 | 3.0 | 75,539 | 2.75 |
| Comparative Example 1 | 0.865 | 4.88 | 16.9 | 0.0 | 81,533 | 2.26 |
| Comparative Example 2 | 0.862 | 3.43 | 19.0 | 0.0 | 89,200 | 2.20 |

As shown in Table 3, it was found that the copolymers according to the present invention has a relatively higher content of long chain branches, that is, 3 to 5 long chain branches per 1000 carbons along the copolymer main chain, while having a density, melt index, molecular weight and molecular weight distribution being similar to those of copolymer purchased from Dow or Mitsui, used in Comparative Examples.

It is because that the transition metal compound according to the present invention has an advantageous structure, in which long chain branches formed upon polymerization are easily introduced to the elongation chain, as compared to the transition metal compounds of Comparative Examples.

The copolymer according to the present invention has a high content of long chain branches, thereby having excellent processability, as compared to a copolymer having no long chain branch. In addition, even though having a high content of long chain branch, the copolymer according to the present invention exhibits uniform, excellent mechanical and physical properties, as compared to a high pressure low density polyethylene product having a wide molecular weight distribution.

The invention claimed is:

1. An ethylene-1-butene copolymer having
   a) a molecular weight distribution (Mw/Mn) of 1.5 or above and less than 3.5 (1.5≤Mw/Mn<3.5);
   b) 3 to 5 long chain branches per 1000 carbons along the copolymer main chain; and
   c) a density of 0.863 to 0.865 g/cc.

2. The ethylene-1-butene copolymer according to claim 1, wherein the ethylene-1-butene copolymer is prepared by polymerizing ethylene and 1-butene in the presence of a catalyst composition comprising a transition metal compound of the following Formula 1:

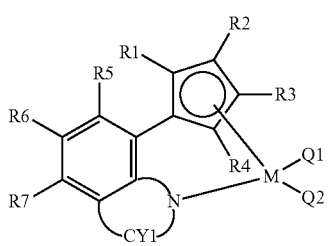

[Formula 1]

wherein R1 to R7 are the same as or different from each other, and are each independently selected from the group consisting of hydrogen, a halogen radical, an alkyl radical having 1 to 20 carbon atoms, an aryl radical having 6 to 20 carbon atoms, an alkenyl radical having 2 to 20 carbon atoms, an alkylaryl or arylalkyl radical having 7 to 20 carbon atoms, a Group 14 metalloid radical substituted with hydrocarbyl, an alkoxy radical having 1 to 20 carbon atoms, an aryloxy radical having 6 to 20 carbon atoms, a silyl radical and an amino radical, in which two or more thereof may be connected to each other by an alkylidene radical containing an alkyl radical having 1 to 20 carbon atoms or aryl radical having 6 to 20 carbon atoms to form an aliphatic or aromatic ring, CY1 is a substituted or unsubstituted aliphatic or aromatic ring, in which CY1 is substituted with at least one selected from the group consisting of hydrogen, a halogen radical, an alkyl radical having 1 to 20 carbon atoms and aryl radical having 6 to 20 carbon atoms, and in the case where CY1 is substituted with the plural substituents, two or more substituents may be connected to each other to form an aliphatic or aromatic ring;

M is a Group 4 transition metal;

N is a nitrogen atom; and

Q1 and Q2 are the same as or different from each other, and are each independently selected from the group consisting of a halogen radical, an alkyl amido radical having 1 to 20 carbon atoms, an aryl amido radical having 6 to 20 carbon atoms, an alkyl radical having 1 to 20 carbon atoms, an alkenyl radical having 2 to 20 carbon atoms, an aryl radical having 6 to 20 carbon atoms, an alkylaryl or arylalkyl radical having 7 to 20 carbon atoms and alkylidene radical having 1 to 20 carbon atoms.

3. The ethylene-1-butene copolymer according to claim 2, wherein the transition metal compound represented by Formula 1 is a transition metal compound represented by the following Formula 2:

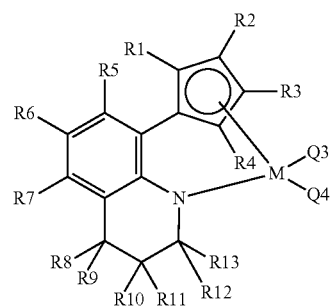

[Formula 2]

wherein R1 to R13 are the same as defined in R1 to R7 of Formula 1, and M, N, Q3 and Q4 are the same as defined in M, N, Q1 and Q2 of Formula 1.

4. The ethylene-1-butene copolymer according to claim 3, wherein the transition metal compound represented by Formula 2 is a transition metal compound represented by the following Formula 3:

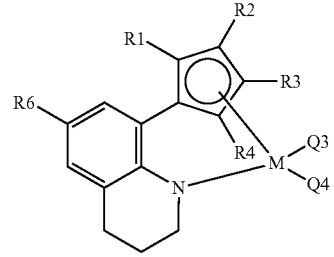

[Formula 3]

wherein R1 to R4, R6, M, N, Q3 and Q4 are the same as defined in Formula 2.

5. The ethylene-1-butene copolymer according to claim 3, wherein the transition metal compound represented by Formula 2 is a transition metal compound represented by the following Formula 4:

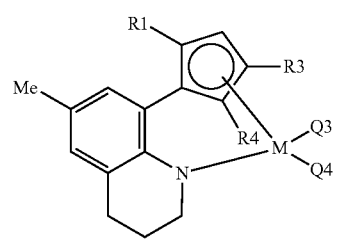

[Formula 4]

wherein R1, R3, R4, M, N, Q3 and Q4 are the same as defined in Formula 2.

6. The ethylene-1-butene copolymer according to claim 2, wherein the catalyst composition comprising the transition metal compound of Formula 1 further comprises one or more of cocatalyst compounds represented by the following Formulae 5 to 7:

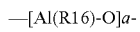 —[Al(R16)-O]$_a$- [Formula 5]

wherein R16 is each independently selected from the group consisting of a halogen radical, a hydrocarbyl radical having 1 to 20 carbon atoms, and a hydrocarbyl radical having 1 to 20 carbon atoms which is substituted with halogen, a is an integer of 2 or more;

$$D(R17)_3 \qquad \text{[Formula 6]}$$

wherein D is aluminum or boron;
R17 is each independently selected from the group consisting of a halogen radical, a hydrocarbyl radical having 1 to 20 carbon atoms, and a hydrocarbyl radical having 1 to 20 carbon atoms which is substituted with halogen;

$$[L\text{-}H]^+[ZA_4]^- \text{ or } [L]^+[ZA_4]^- \qquad \text{[Formula 7]}$$

wherein L is cationic Lewis acid;
H is a hydrogen atom;
Z is an element of Group 13 selected from B, Al, Ga, In and Tl; and
A is each independently an aryl radical having 6 to 20 carbon atoms, or an alkyl radical having 1 to 20 carbon atoms, wherein at least one hydrogen atom in said aryl radical and alkyl radical is substituted with halogen, a hydrocarbyl having 1 to 20 carbon atoms, alkoxy, or phenoxy radical.

7. The ethylene-1-butene copolymer according to claim 2, wherein the ethylene-1-butene copolymer is prepared by contacting the catalyst composition comprising the transition metal compound of Formula 1, ethylene, and 1-butene by a continuous solution polymerization process.

8. The ethylene-1-butene copolymer according to claim 7, wherein a molar ratio of ethylene to 1-butene is 100:1 to 1:100.

\* \* \* \* \*